United States Patent [19]

Izumi

[11] Patent Number: 5,059,795
[45] Date of Patent: Oct. 22, 1991

[54] MULTIPLE BEAM RADIATION IMAGE READING APPARATUS

[75] Inventor: Masaki Izumi, Yokohama, Japan

[73] Assignee: Eastman Kodak Company, Rochester, N.Y.

[21] Appl. No.: 571,362

[22] Filed: Aug. 23, 1990

[51] Int. Cl.$^5$ ............................................. G03B 42/00
[52] U.S. Cl. ................................................... 250/327.2
[58] Field of Search ............ 250/327.2, 484.1, 327.2 E

[56] References Cited

U.S. PATENT DOCUMENTS

| | | | |
|---|---|---|---|
| 4,051,528 | 9/1979 | Takeda et al. | 358/128 |
| 4,302,671 | 11/1981 | Kato et al. | 250/327.2 |
| 4,655,590 | 4/1987 | Aagano et al. | 356/72 |
| 4,762,998 | 8/1988 | Lubinsky et al. | 250/327.2 |
| 4,816,679 | 3/1989 | Sunagawa et al. | 250/327.2 |
| 4,876,452 | 10/1989 | Horikawa | 250/327.2 |
| 4,950,895 | 8/1990 | Reinferler | 250/327.2 |

FOREIGN PATENT DOCUMENTS 60-149042  8/1985  Japan .............................. 250/327.2

*Primary Examiner*—Constantine Hannaher
*Assistant Examiner*—Edward J. Glick
*Attorney, Agent, or Firm*—Raymond L. Owens

[57] ABSTRACT

A radiation image reading apparatus is described which is adapted to read out a radiation image from a storage phosphor plate by scanning an excitation light on the plate and detecting phosphor light caused by the scanning of the excitation light. In the apparatus, the excitation light is emitted onto each of the pixels of the plate from a plurality of laser beam sources, so that the combined total beam spots on the pixel has a sharp light intensity rising characteristics so that the image information stored on the neighboring pixels is hardly affected.

6 Claims, 2 Drawing Sheets

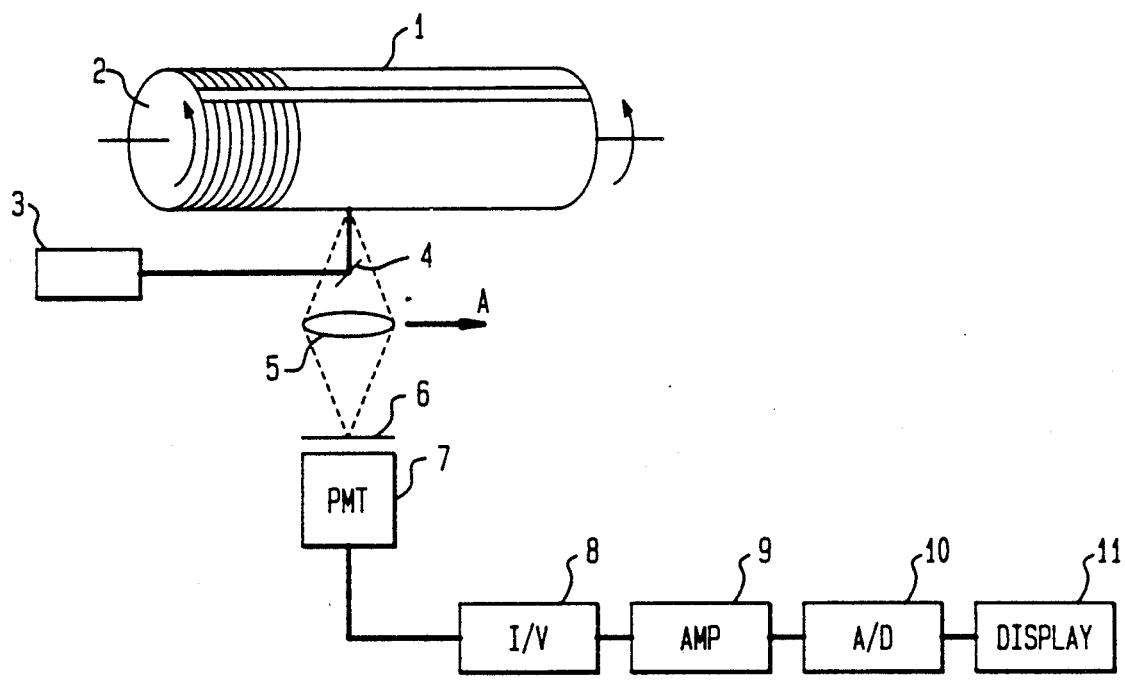
FIG. 1
(PRIOR ART)
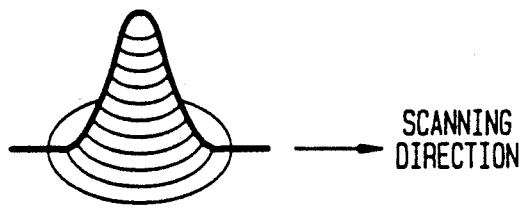 
FIG. 2A  SCANNING DIRECTION   FIG. 2B
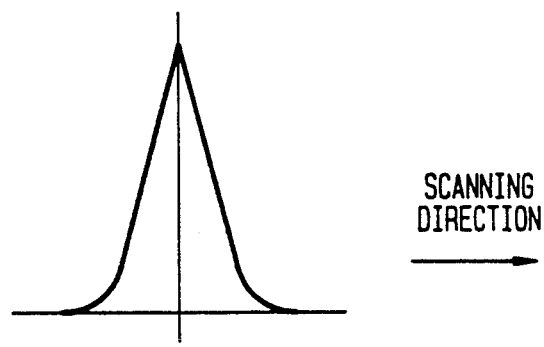
FIG. 2C  SCANNING DIRECTION

MULTIPLE BEAM RADIATION IMAGE READING APPARATUS

BACKGROUND OF THE INVENTION

1. Field of the Invention

The present invention relates to a radiation image reading apparatus and more particularly to a radiation image reading apparatus adapted to irradiate an excitation light onto a phosphorescent storage plate on which radiation image information is recorded, and to read out the radiation image information by detecting the light volume of the phosphor light emitted from the phospholescent plate caused by the irradiation of the excitation light.

2. Prior Art

Recently, there has been proposed such a radiation image recording and reproduction system adapted to record radiation image information of an object on a phosphorescent storage plate which is called an "Imaging Plate (IP)", generate a phosphor light by scanning the information on the plate with an excitation light, obtain an image signal of the object by reading the image information by means of a photoelectric transfer means, and display the image information on an appropriate display as a visible image or record it on a film as required. According to this prior recording and reproducing apparatus, exposure to radiation such as X-rays may be mitigated by light sensitivity characteristics of the phosphorescent storage material and the phosphorescence plate may be repetitively utilized as the recorded image may be erased. Furthermore, since the obtained signal from the photoelectric transfer means is digitally processed, the image may be easily processed for the display. Thus, various advantages may be anticipated.

An example of an image reading apparatus employed in the prior radiation image recording and reproducing system described above will now be explained by referring to FIG. 1. It is to be understood that an image reading apparatus may be constructed in such a way that an optical deflector such as a polygon mirror, a galvanometer mirror or the like is employed so as to deflect a laser beam and provide raster-scanning with the laser beam on the phosphorescent storage plate of a flat sheet type. Herein, a reading apparatus which employs a rotary drum winding a phosphorescent plate therearound will be described for convenience.

In FIG. 1, numeral 1 designates a phosphorescent storage plate, and numeral 2 designates a high speed rotary drum with the phosphorescent plate 1 wound therearound. Numeral 3 designates a laser beam source adapted to generate a single laser beam, and numeral 4 a mirror adapted to direct the laser beam from the laser beam source 3 onto the phosphorescent plate 1. Numeral 5 designates a focusing lens, numeral 6 a filter the filtering characteristics of which are set such that the laser beam from the source 3 is shielded to allow only the phosphor light to pass therethrough, numeral 7 a photo multiplier (PMT), numeral 8 a current/voltage (I/V) converter, numeral 9 an amplifier, numeral 10 an analog/digital (A/D) converter, and numeral 11 a display.

In the reading apparatus according to a prior art described above, when the rotary drum 2 is rotated at a high speed, and the optical system comprising the mirror 4, focusing lens 5, filter 6 and photomultiplier 7 is shifted in parallel in the axial direction of the rotary axis of the rotary drum 2 (in the direction indicated by an arrow "A" as shown in FIG. 1), the laser beam may be raster-scanned on the phosphorescent plate 1. The phosphorescent plate 1 is caused to emit light by irradiation with the laser beam, and the emitted light is focused by the focusing lens 5 and detected and converted into a current signal at the photomultiplier 7. The obtained current signal of the radiation image information will be converted to a voltage signal at the I/V converter 8 and input to the A/D converter 10 via the amplifier 9 whereby it is converted to a digital signal, and input to the image display 11. In this way, the image read from the phosphorescent plate 1 can be displayed in the display apparatus 11 as a visible image and stored in an appropriate information recording medium, for example a film, as required.

It is to be understood that the intensity distribution of a single laser beam is supposed to take a form generally similar to Gaussian distribution as shown in FIG. 2A and form a wide base part. Besides, since the above-mentioned reading apparatus is based on a destructive scanning method, the image which has been stored on the phosphorescent plate 1 will likely be lost if it is irradiated by the excitation light so as to read out the image. The more intense the excitation light is, the greater the amount of the stored image, which is lost.

Accordingly when the laser beam is scanned on such a slit image as shown in FIG. 2B, the base part of the laser beam may have reached the slit image before the peak of the laser beam arrives at the slit image, and the phosphorescent plate 1 may have been excited thereby. As a result, a certain amount of phosphor light has to be emitted from the slit part of the plate before the image should be exactly scanned. In other words, light emission may be caused before the peak of the beam arrives at the front part of the slit image, and the image at the front part is destroyed to a certain extent so that the reproduced image becomes obscure at the front part of the slit image when the part is exactly read out. On the other hand, since the slit image has been largely destroyed and diminished after the peak of the laser beam has passed through the slit, almost no excitation will be generated by the opposite base part of the laser beam. This will cause the line spread function (LSF) to be asymmetrical as shown in FIG. 2C, or the sharpness in the scanning direction will be degraded more than in the opposite direction not only in the main scanning direction but also in the sub-scanning direction.

It is conceivable to make the configuration of a laser beam having a sharp rise by increasing the focus of the light in order to narrow the base part or decrease the light in the base part. In that case, however, since the excitation light will be irradiated only onto a part of each pixel area in the case of a laser beam source emitting a single laser beam, the entire area of the pixel cannot be excited. Consequently, only a part of the image information stored in the respective pixels may be read out and the reproduced image cannot represent exactly the recorded image.

SUMMARY OF THE INVENTION

The present invention has been proposed in view of the problems associated with the prior art. Accordingly an object of the present invention is to provide a radiation image reading apparatus of a type which executes destructive scanning of a radiation image by using a laser beam, and which is adapted to improve the sharpness of an image by restricting degradation in the sharpness of the image in the scanning direction.

The object mentioned above is achieved by a radiation image reading apparatus including multiple laser beam source means for providing multiple beam spots onto each of pixels on a phosphorescent plate at once, so that the multiple beam spots are equivalent to a single beam spot having substantially no base part. An advantage of this arrangement is that the multiple beam spots will not interfere with adjacent pixels.

BRIEF DESCRIPTION OF THE DRAWINGS

FIG. 1 schematically shows a radiation image reading apparatus according to a prior art;

FIGS. 2A through 2C are explanatory views showing why reading sharpness of an image in the main scanning direction may be degraded in a prior reading apparatus as shown in FIG. 1;

DETAILED DESCRIPTION OF THE PREFERRED EMBODIMENTS

Figure 3A:
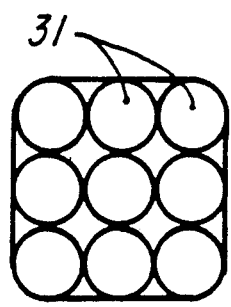
FIGS. 3A through 3C illustrate arrangement examples of laser diodes which can be used as a multiple laser beam source in a radiation image reading apparatus according to the present invention.
Figure 3B:
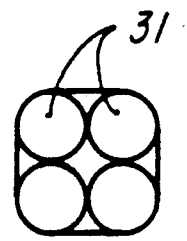
Figure 3C:
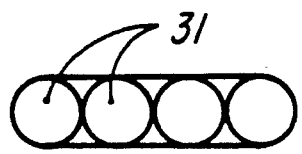

Embodiments of a laser beam source used in a radiation image reading apparatus according to the present invention are illustrated in section in FIGS. 3A through 3C. The respective laser beam sources shown in FIGS. 3A through 3C comprise a plurality of laser diodes 31 adapted to generate a multiplicity of beams. The other components (not shown) are similar to those shown in FIG. 1.

The multiple beam sources shown in FIG. 3A and 3B have the laser diodes 31 arranged in a manner such that the multiple beam spots can be formed within each of the pixel areas in the two dimensional manner, or in both the main scanning direction and the sub-scanning direction. FIG. 3C illustrates a laser beam source with the laser diodes 31 arranged in a manner such that the multiple beam spots are formed in the respective pixel areas in the one-dimensional manner, or in the sub-scanning direction. The beam spot formed by each laser diode 31 has a particular dimensional magnitude much less than the dimensional magnitude of an individual pixel. It is to be noted that the arrangement of multiple beam sources is not limited to the ones shown in FIGS. 3A through 3C but the multiple beam sources of an appropriate quantity and arrangement may be provided depending on the pixel size as decided by scanning in the main and sub-scanning directions. It is also to be noted that a square or a rectangular arrangement of the laser diodes as shown in FIGS. 3A through 3C will have less influence over the next pixel to be read than would otherwise be the case. In case of a rectangular arrangement of laser beams as shown in FIG. 3C, an integration circuit or the like may be inserted in the fore-stage of the A/D converter 10 (shown in FIG. 1) in the signal processing circuit so that all image information in each pixel area may be obtained. It is further to be noted that the respective laser generating means are not limited to laser diodes but any other normal laser beam sources may be employed if they are able to generate multiple beams having a sharp rise.

Figure 4:
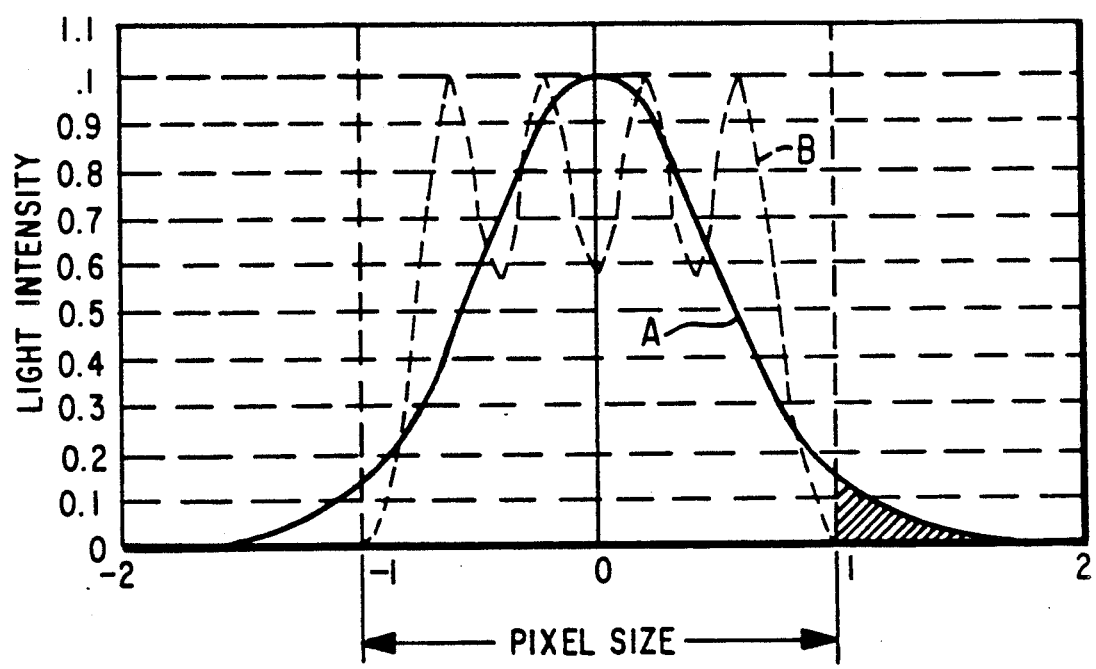
FIG. 4 is a graph showing for purposes of comparison of phosphor light intensity in the case of a single laser beam being employed and that in the case of a multiple laser beam source being employed.

In FIG. 4, there is illustrated a graph in which light intensity characteristics according to a prior art using a single beam (Curve A) and light intensity characteristics attained by arranging four multiple beam sources linearly as shown in FIG. 3C (Curve B) are compared.

As is apparent from this graph, the base portion (indicated by diagonal line hatching) which extends beyond the pixel area is considerable in the case of a single beam source being employed while such a base portion does not substantially exist due to the respective beams being concentrated on small spots in the case of multiple laser beam sources being employed, so that the beam spots will hardly go out of the respective pixel areas. With respect to a rise seen from the direction vertical to the drawing, the multiple beams as represented by the Curve B have a naturally sharper rise than the single beam. The multiple beam light has a sharp light intensity rising characteristic. In other words, when multiple beams are employed, there is substantially no base portion of the laser beam both in the main and sub-scanning direction, thereby the sharpness of images may be improved in both scanning directions.

It is further understood by those skilled in the art that various changes and modification may be made in the invention without departing from the spirit and scope thereof.

The invention has been described in detail with particular reference to certain preferred embodiments thereof, but it will be understood that variations and modifications can be effected within the spirit and scope of the invention.

What is claimed is:

1. An apparatus for reading out a radiation image from a storage phosphor plate on which the radiation image has been recorded in a plurality of pixels, by scanning an excitation light thereonto and detecting emitted light caused by the scanning of the excitation light, the improvement comprising a plurality of laser beam source means for simultaneously irradiating excitation light having multiple laser beam spots, each laser beam spot having a particular dimensional magnitude, onto each of the pixels on said phosphorescent storage plate, said plurality of laser beam source means being arranged adjacent each other in at least a one dimensional array so that a single laser beam spot is formed by said multiple laser beam spots, such that said single laser beam spot extends in at least one dimension along a direction perpendicular to the main scanning direction with a particular dimensional magnitude greater than that of any one of said multiple laser beam spots so that said pixel is illuminated with said single laser beam spot having a sharp light intensity rising characteristic formed by combining said multiple laser beam spots.

2. The apparatus of claim 1, wherein said multiple laser beam source means comprises a plurality of laser beam sources arranged in a two-dimensional array so as to form said multiple beam spots in a combined beam extending in two dimensions along the main and sub-scanning direction.

3. Apparatus for reading out a radiation image from a storage phosphor plate on which the radiation image has been recorded in a plurality of pixels comprising:

a plurality of laser light sources, each laser light source producing a beam having a beam spot with a particular dimensional magnitude, arranged adjacent each other in at least a one dimensional array so as to direct their beams of light as a combined single beam of light such that said combined single beam of light extends in at least one dimension with a particular dimensional magnitude greater than that of any one beam spot of said plurality of laser light sources onto each of the pixels of said phosphor plate;

means for simultaneously operating all of said laser light sources so that each pixel is illuminated with said combined single beam of light having a sharp light intensity rising characteristic;

means for scanning said combined single beam of light on the storage phosphor plate; and means for detecting emitted light caused by the scanning of the combined single beam of light.

4. The apparatus of claim 3 wherein said combined single beam of light from said laser light sources extends in one dimension along a direction perpendicular to the main scanning direction.

5. The apparatus of claim 3 wherein said laser light sources are arranged in a two-dimensional array so as to direct their beams of light as a combined single beam of light which extends in two-dimensions.

6. The apparatus of claim 5 wherein said combined single beam of light from said laser light sources extends in two-dimensions along the main and sub-scanning directions.

* * * * *